US010421375B2

(12) United States Patent
Sakurai

(10) Patent No.: US 10,421,375 B2
(45) Date of Patent: Sep. 24, 2019

(54) RECLINING DEVICE

(71) Applicant: SHIROKI CORPORATION, Fujisawa-shi (JP)

(72) Inventor: Noriyuki Sakurai, Fujisawa (JP)

(73) Assignee: SHIROKI CORPORATION, Fujisawa-Shi, Kanagawa (JP)

(*) Notice: Subject to any disclaimer, the term of this patent is extended or adjusted under 35 U.S.C. 154(b) by 58 days.

(21) Appl. No.: 15/801,155

(22) Filed: Nov. 1, 2017

(65) Prior Publication Data
US 2018/0134185 A1 May 17, 2018

(30) Foreign Application Priority Data

Nov. 17, 2016 (JP) .................................. 2016-224107
Nov. 17, 2016 (JP) .................................. 2016-224108

(51) Int. Cl.
*B60N 2/22* (2006.01)
*B60N 2/225* (2006.01)
*A47C 1/024* (2006.01)

(52) U.S. Cl.
CPC ............ *B60N 2/2252* (2013.01); *A47C 1/024* (2013.01); *B60N 2/2254* (2013.01)

(58) Field of Classification Search
CPC .... B60N 2/2252; B60N 2/235; B60N 2/2254; B60N 2/2352; B60N 2/2356; B60N 2/2213; B60N 2/2231; B60N 2/225; B60N 2/2251; A47C 1/024; A47C 1/025; A47C 1/026
USPC .... 297/362, 374, 367 R, 366, 361.1, 354.12, 297/354.1, 368, 369
See application file for complete search history.

(56) References Cited

U.S. PATENT DOCUMENTS

| 5,524,970 | A | * | 6/1996 | Kienke | B60N 2/2255 297/362 |
| 6,474,734 | B1 | * | 11/2002 | Masuda | B60N 2/4214 297/216.13 |
| 7,407,230 | B1 | * | 8/2008 | Luo | B60N 2/236 297/367 R |
| 9,302,599 | B2 | * | 4/2016 | Mase | B60N 2/2356 |
| 9,706,844 | B2 | * | 7/2017 | Sakurai | F16D 59/02 |
| 2002/0050732 | A1 | * | 5/2002 | Koga | B60N 2/2252 297/362 |
| 2002/0089225 | A1 | * | 7/2002 | Bruck | B60N 2/2352 297/378.11 |

(Continued)

FOREIGN PATENT DOCUMENTS

JP    5418197 B2    2/2014

*Primary Examiner* — Mark R Wendell
(74) *Attorney, Agent, or Firm* — McGinn I.P. Law Group, PLLC.

(57) ABSTRACT

A reclining device includes: an internal gear; an external gear; a first wedge and a second wedge; a biasing member; and a striker, which has a pressing portion capable of pressing the first wedge and the second wedge, wherein a concave portion recessed with passing though in a diameter direction is formed on the first wedge and the second wedge, wherein the pressing portion of the striker is superimposed on an upper surface of the concave portion, and wherein the pressing portion presses a pressed portion that is provided on the concave portion on at least one of the first wedge and the second wedge to move the one of the first wedge and the second wedgepressed portion in a direction in which the wedge is pulled out from or in a direction in which the wedge is pushed.

16 Claims, 13 Drawing Sheets

(56) References Cited

U.S. PATENT DOCUMENTS

| | | | |
|---|---|---|---|
| 2002/0180251 A1* | 12/2002 | Pospeshil | B60N 2/206 297/378.14 |
| 2004/0004384 A1* | 1/2004 | Iwata | B60N 2/2252 297/367 R |
| 2006/0158012 A1* | 7/2006 | Kawashima | B60N 2/2252 297/362 |
| 2006/0170269 A1* | 8/2006 | Oki | B60N 2/20 297/367 R |
| 2007/0004550 A1* | 1/2007 | Krambeck | B60N 2/2252 475/162 |
| 2007/0108824 A1* | 5/2007 | Lange | B60N 2/2252 297/367 R |
| 2007/0138853 A1* | 6/2007 | Ito | B60N 2/2252 297/362 |
| 2008/0061616 A1* | 3/2008 | Wahls | B60N 2/2252 297/362 |
| 2009/0224588 A1* | 9/2009 | Matsumoto | B60N 2/2254 297/362 |
| 2009/0295210 A1* | 12/2009 | Fukuzawa | B60N 2/2252 297/362 |
| 2010/0176640 A1* | 7/2010 | Hayashi | B60N 2/2254 297/362 |
| 2010/0201174 A1* | 8/2010 | Ito | B60N 2/0232 297/362 |
| 2010/0308634 A1* | 12/2010 | Narita | B60N 2/0232 297/362 |
| 2011/0254337 A1* | 10/2011 | Jiang | B60N 2/2252 297/362 |
| 2012/0007402 A1* | 1/2012 | Stilleke | B60N 2/2252 297/362 |
| 2012/0267932 A1* | 10/2012 | Narita | B60N 2/2252 297/354.1 |
| 2013/0033081 A1* | 2/2013 | Aoi | B60N 2/22 297/354.1 |
| 2013/0106161 A1* | 5/2013 | Ohba | B60N 2/682 297/362 |
| 2013/0207432 A1* | 8/2013 | Hiemstra | B60N 2/2252 297/362 |
| 2013/0313879 A1* | 11/2013 | Bedro | B60N 2/0232 297/362 |
| 2014/0001806 A1* | 1/2014 | Golarz | B60N 2/225 297/362 |
| 2014/0008956 A1* | 1/2014 | Golarz | B60N 2/225 297/354.1 |
| 2014/0097659 A1* | 4/2014 | Wahls | B60N 2/6009 297/362 |
| 2014/0225411 A1* | 8/2014 | Matt | B60N 2/682 297/362 |
| 2014/0292055 A1* | 10/2014 | Ito | B60N 2/2213 297/362 |
| 2015/0069809 A1* | 3/2015 | Matt | B60N 2/2252 297/366 |
| 2015/0091354 A1* | 4/2015 | Enokijima | B60N 2/20 297/354.12 |
| 2015/0258918 A1* | 9/2015 | Chang | B60N 2/2252 297/362.12 |
| 2015/0291063 A1* | 10/2015 | Enokijima | A47C 1/025 297/361.1 |
| 2015/0298583 A1* | 10/2015 | Kim | B60N 2/2252 297/362 |
| 2016/0059743 A1* | 3/2016 | Tsuji | B60N 2/2252 297/362 |
| 2016/0200222 A1* | 7/2016 | Desquesne | B60N 2/2252 297/354.12 |
| 2016/0272089 A1* | 9/2016 | Kim | B60N 2/2252 |
| 2017/0327009 A1* | 11/2017 | Kim | B60N 2/2213 |
| 2018/0134185 A1* | 5/2018 | Sakurai | A47C 1/024 |

\* cited by examiner

FIG.3
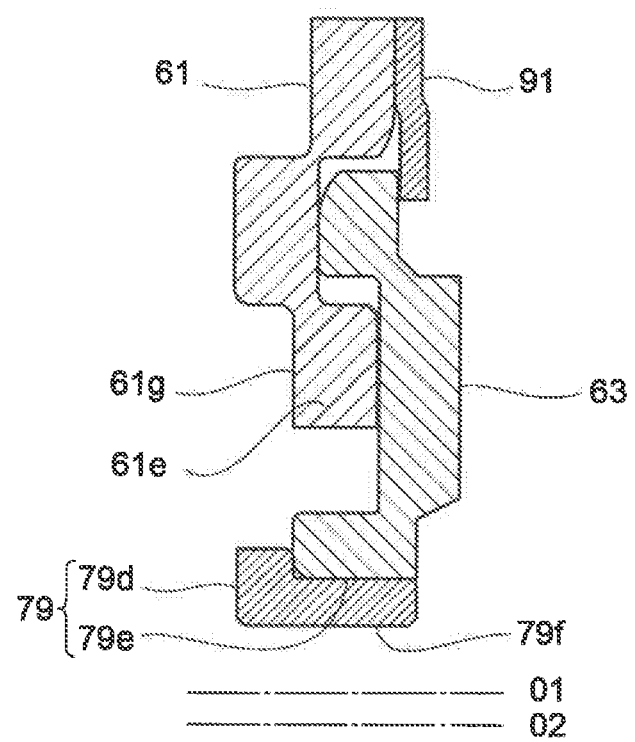
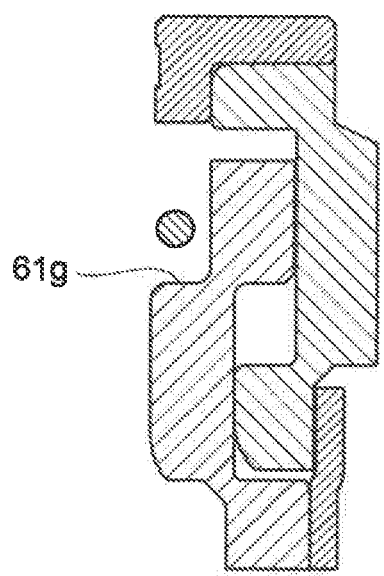

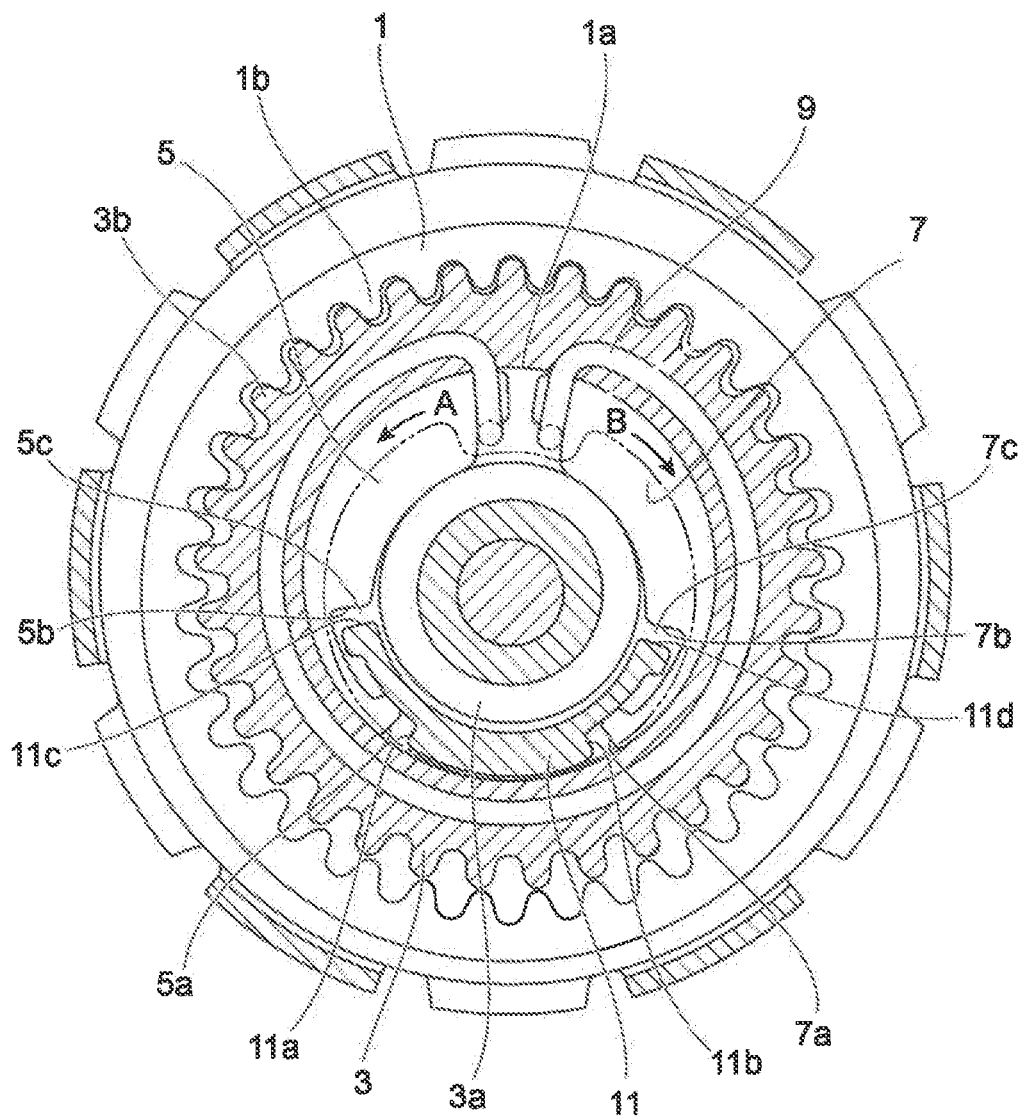
FIG.13  -BACKGROUND ART-

RECLINING DEVICE

CROSS-REFERENCE TO RELATED APPLICATION

This application claims priority from Japanese Patent Applications No. 2016-224107 and No. 2016-224108 filed on Nov. 17, 2016 the entire subject matter of which is incorporated herein by reference.

TECHNICAL FIELD

This disclosure relates to a Taumel type reclining device that changes a tilting angle of a seat back with respect to a seat cushion.

BACKGROUND

The Taumel type reclining device is a device in which an internal gear is provided on one of the seat cushion side and the seat back side, an external gear that has a smaller number of teeth than the internal gear and that is engaged with the internal gear is provided on the other of the seat cushion side and the seat back side. A position where the internal gear and the external gear engage is changed while one of the internal gear and the external gear eccentrically moves about a rotation axis of the other gear and thus a tilting angle of the seat back with respect to the seat cushion changes.

As illustrated in FIG. 13, a pair of a wedge (wedge-shaped member) 5 and a wedge (wedge-shaped member) 7 are arranged in an eccentric annular space between an internal surface of a circular hole 1a of an internal gear 1 and an external surface of a cylinder 3a of an external gear 3. The pair of the wedge 5 and the wedge 7 are biased by a spring 9 in a direction (direction indicated by an arrow A or an arrow B) in which the wedge is pushed into a narrow-width portion of the eccentric annular space.

A groove 5c and a groove 7c recessed with passing though in a rotation-axis direction are formed in wedge front end sides of the wedge 5 and the wedge 7.

The wedge 5 and the wedge 7 respectively press the internal surface of the circular hole 1a and the external surface of the cylinder 3a to bias the internal gear 1 and the external gear 3 in a direction in which an amount of eccentricity between rotation axes of both likely to increase. Then an internal tooth 1b of the internal gear 1 and an external tooth 3b of the external gear 3 are fully engaged with each other. Thus, the seat back is not tiled (locked state: a non-operating state).

An abutting surface 11a and an abutting surface 11c, or an abutting surface 11b and an abutting surface 11d of a striker (lock release member) 11 press a surface 5a and a surface 5b or a surface 7a and a surface 7b, which are on the wedge front end sides of the wedge 5 and the wedge 7, against an urging force of the spring 9 to press the wedge 5 or the wedge 7 in a direction (direction opposite to the direction into which the wedge is pushed which is a direction opposite to the arrow A direction or the arrow B direction) in which the wedge is pulled out. When, the striker 11 presses the wedge 5 or the wedge 7 to move, a pressing force to make the wedge 5 or the wedge 7 be in contact with the internal surface of the circular hole 1a or the external surface of the cylinder 3a decreases and, the engagement between the internal tooth 1b and the external tooth 3b is loosened. Thus, the seat back is in a state where the tilting is possible.

When the wedge 5 or the wedge 7 starts to move, the wedge 7 or the wedge 5 stops due to friction between the internal surface of the circular hole 1a and the external surface of the cylinder 3a. However, when one wedge moves in the direction in which the wedge is pulled out, due to an elastic repulsion force of the spring 9, the other wedge moves in the direction in which the wedge is pushed into the eccentric annular space. By repeating the operation, an engagement part changes and the seat back is tilted while retaining the state of eccentricity between the internal gear and the external gear (lock-released state: an operating state) (refer to Japanese Patent No. 5418197).

SUMMARY

However, in the reclining device with a configuration illustrated in FIG. 13, when pressure is applied to the wedge 5 or the wedge 7 in the direction in which the wedge is pulled out and lock is released, a force for holding the pair of the wedge 5 and the wedge 7 is weakened; therefore, the wedge 5 and the wedge 7 are irregularly tilted. This causes a problem in that stable operation of the reclining device is not performed.

Furthermore, since the groove 5c and the groove 7c recessed with passing though in the rotation-axis direction are formed on the wedge front end sides of the wedge 5 and the wedge 7, and ranges of the wedge 5 and the wedge 7 where the wedge 5 and the wedge 7 function as the wedge, in a circumferential direction become small. Accordingly, there is the problem in that the reclining device does not operate stably.

This disclosure provides a reclining device which can operate stably.

A reclining device of this disclosure includes: an internal gear, which includes internal teeth on an internal circumferential surface and is provided on a member that is on one of a seat cushion side and a seat back side, wherein the internal gear is formed with one of a circular hole and a cylinder; an external gear, which includes external teeth which are engaged with the internal teeth of the internal gear and whose number is smaller than the number of the internal teeth on an external circumferential surface, is provided on a member that is on an other of the seat cushion side and the seat back side, wherein in a case where the circular hole is formed in the internal gear, the external gear is formed with a cylinder that is inserted into the circular hole, and in a case where the cylinder is formed in the internal gear, the external gear is formed with a circular hole that is inserted into the cylinder, a first wedge and a second wedge, which are movably provided along a circumferential direction in an eccentric annular space between an internal surface of the circular hole and an external surface of the cylinder; a biasing member, which biases the first wedge and the second wedge in a direction of a narrow-width portion of the eccentric annular space; and a striker, which has a pressing portion capable of pressing the first wedge and the second wedge. A concave portion recessed with passing though in a diameter direction is formed on the first wedge and the second wedge. The pressing portion of the striker is superimposed on an upper surface of the concave portion. The pressing portion presses a pressed portion that is provided on the concave portion on at least one of the first wedge and the second wedge to move the one of the first wedge and the second wedgepressed portion in a direction in which the wedge is pulled out from the narrow-width portion of the eccentric annular space or in a direction in which the wedge is pushed into the narrow-width portion of the eccentric annular space.

Other features of this disclosure become more apparent from embodiments for implementing the invention that will be described below and from the accompanying drawings.

According to this disclosure, the concave portion recessed with passing though in the diameter direction is formed on the first wedge and the second wedge, the protrusion portion that is superimposed on an upper surface of the concave portion is formed on the striker, and when the protrusion portion presses the pressed portion of the wedge, the wedge moves in the direction in which the wedge is pulled out from the narrow-width portion of the eccentric annular space, or in the direction in which the wedge is pushed into the narrow-width portion of the eccentric annular space. Thus, although the groove is formed, ranges of the first wedge and the second wedge where the first wedge and the second wedge function as the wedge in the circumferential direction do not become small. Therefore, the reclining device operates stably.

Furthermore, since the protrusion portion prevents the wedge from being lifted, there is no need to separately install a member (part) for preventing the wedge from being lifted to the striker.

BRIEF DESCRIPTION OF THE DRAWINGS

The foregoing and additional features and characteristics of this disclosure will become more apparent from the following detailed descriptions considered with the reference to the accompanying drawings, wherein:

FIG. 3 is an end view along a section line in FIG. 2;

FIG. 13 is a view illustrating an example in the background art.

DETAILED DESCRIPTION

First Embodiment

Figure 7:
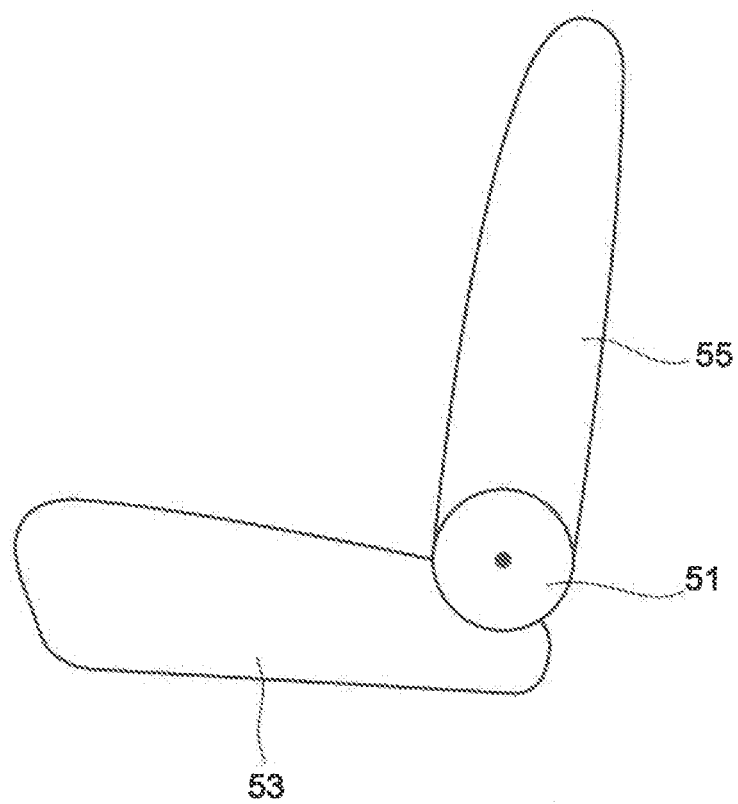
FIG. 7 is a side view of a principal part of a seat to which the reclining device according to the embodiment is assembled.

First, a seat on which a reclining device according to an embodiment is installed will be described with reference to FIG. 7. FIG. 7 is a side view of a principal part of the seat to which the reclining device according to an embodiment is assembled.

As illustrated, a reclining device 51 is provided between a seat cushion 53 and a seat back 55.

Figure 1:
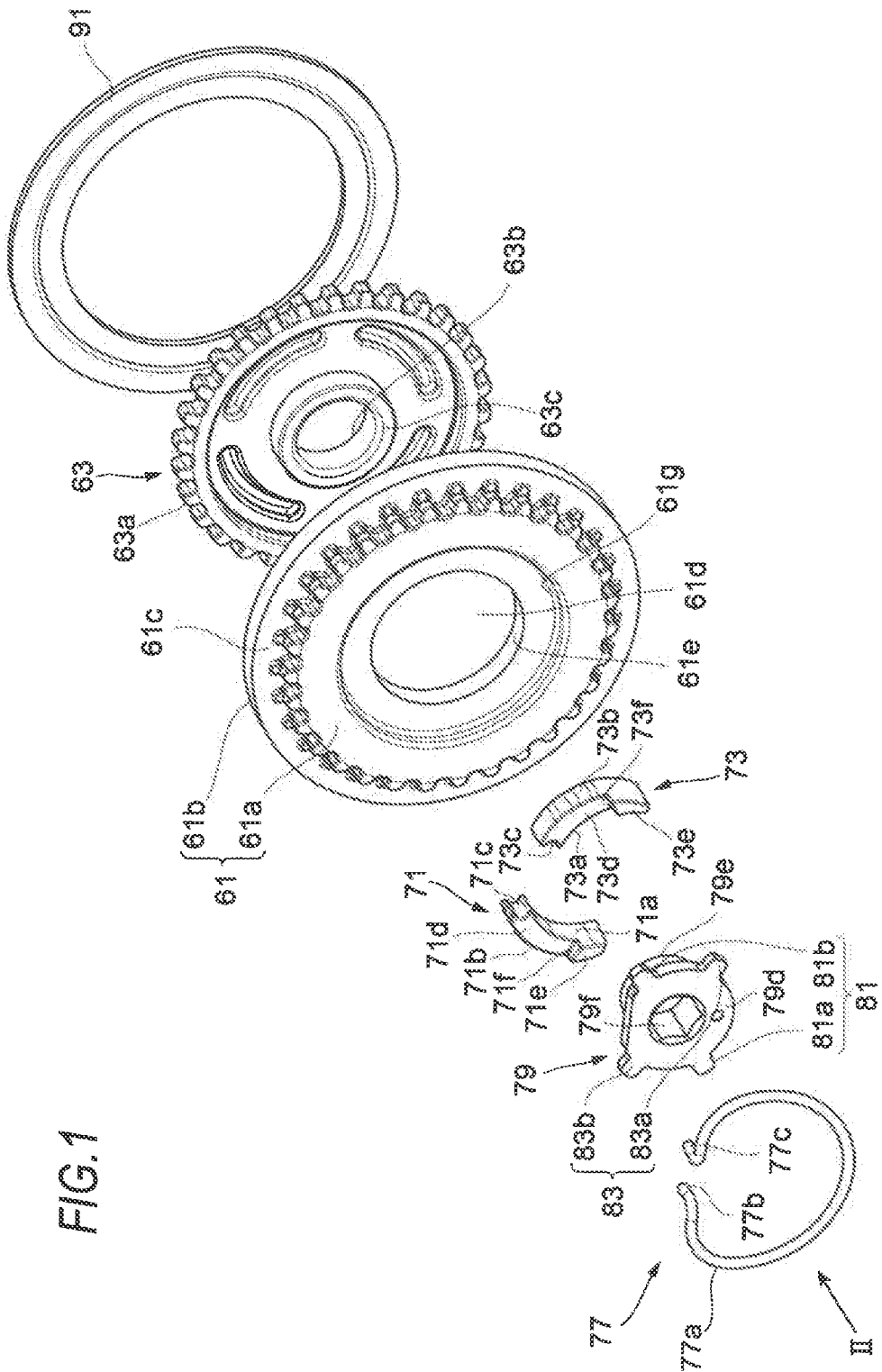
FIG. 1 is an exploded perspective view of a reclining device according to a first embodiment.
Figure 2:
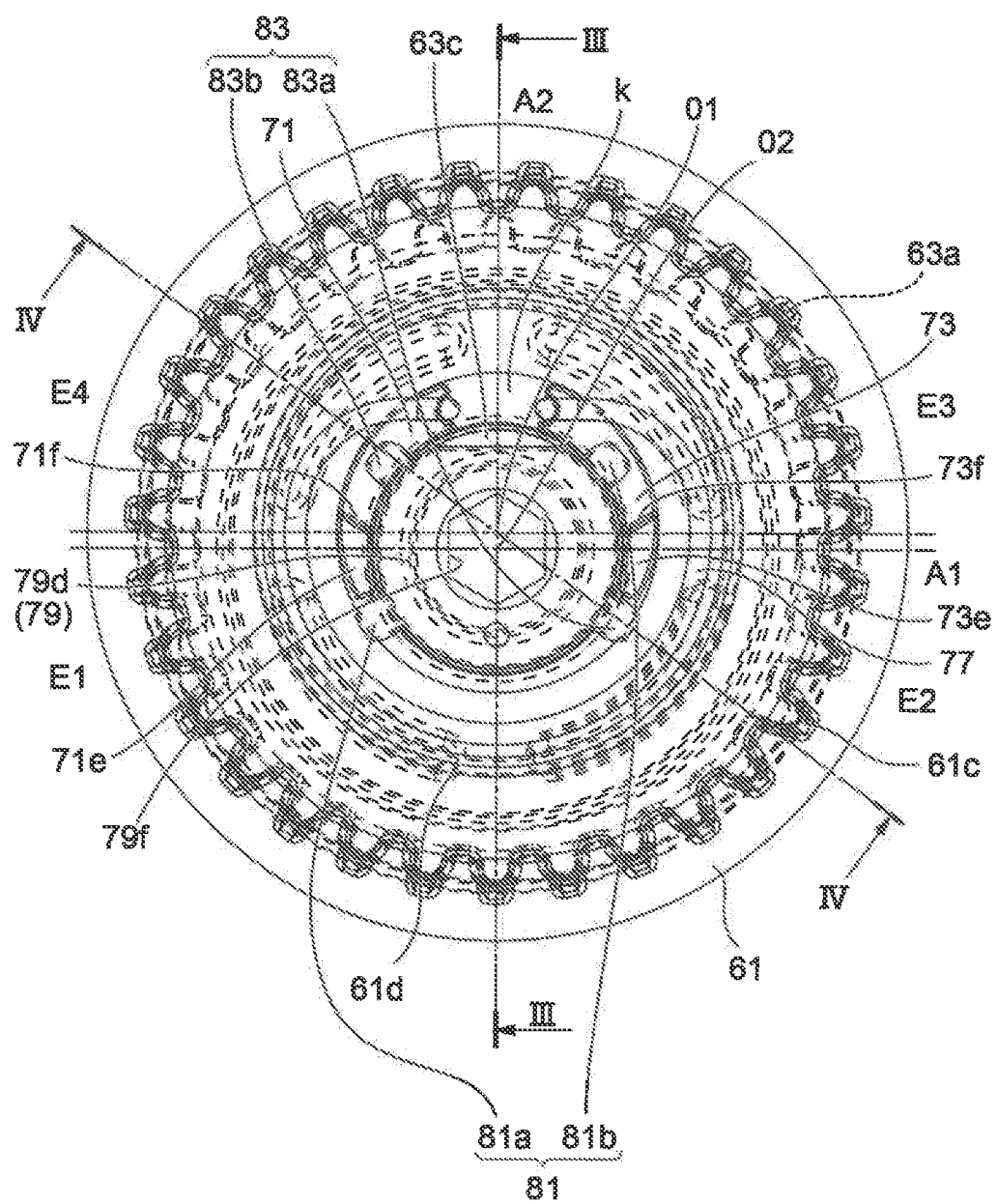
FIG. 2 is a front view of the assembled reclining device in FIG. 1, when viewed from an arrow II direction.
Figure 4:
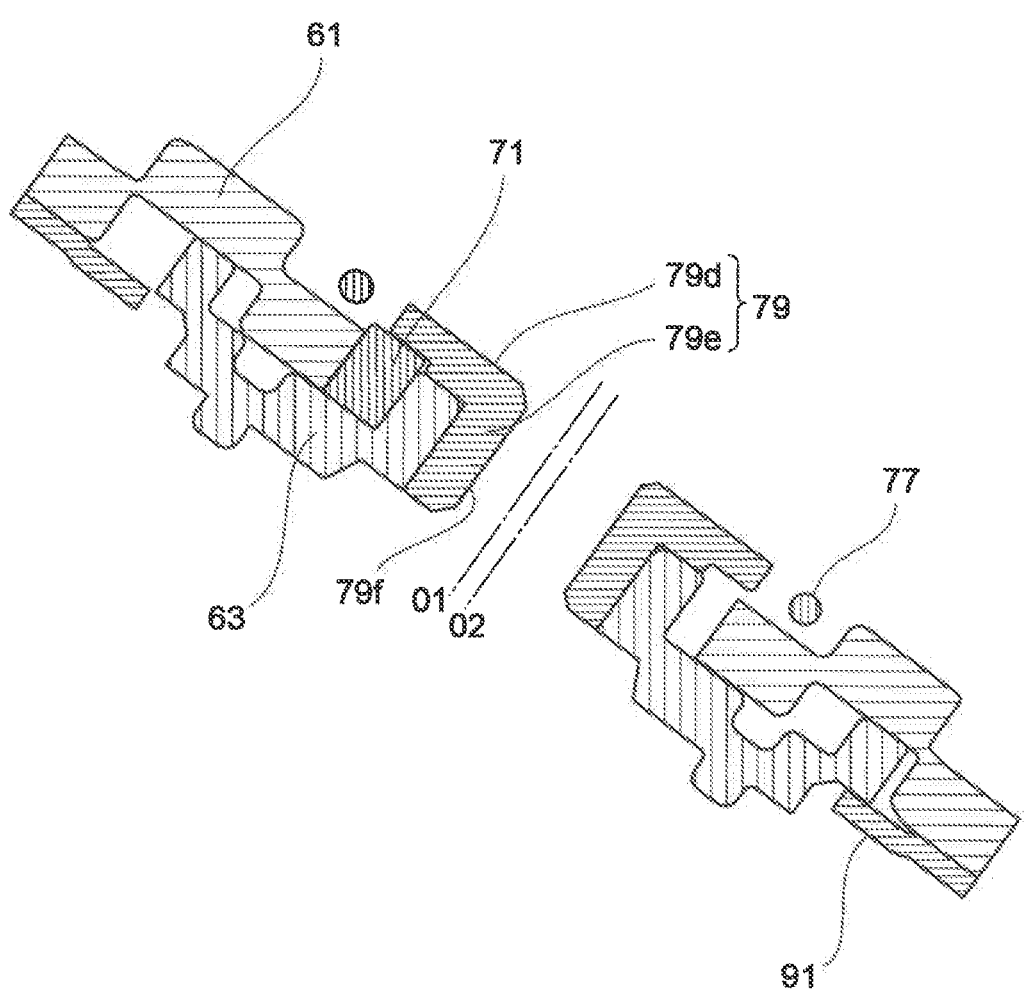
FIG. 4 is an end view along a section line IV-IV in FIG. 2.

Next, the reclining device 51 will be described with reference to FIGS. 1 to 4. FIG. 1 is an exploded perspective view of the reclining device according to the first embodiment. FIG. 2 is a front view of the assembled reclining device in FIG. 1 when viewed from an arrow II direction. FIG. 3 is an end view along a section line in FIG. 2. FIG. 4 is an end view along a section line IV-IV in FIG. 2.

In FIG. 1, an internal gear 61 provided on the seat cushion 53 side is made up of a circular base 61a and a cylindrical upright wall portion 61b formed along a peripheral portion of the base 61a, and is in an approximately a bottomed cylinder shape of which one surface is an opening surface. An internal tooth 61c is formed on the entire internal surface of the upright wall portion 61b in a circumferential direction. Furthermore, a through-hole 61d is formed on the center of the base 61a of the internal gear 61. A cylindrical upright wall portion that protrudes in the direction of the opening surface is formed along the internal circumferential surface of the hole 61d. A circular hole is formed inside of the cylindrical upright wall portion.

An external gear 63 provided on the seat back 55 side is positioned inside of the bottomed-cylindrical internal gear 61. An external tooth 63a is formed on the entire external surface of the external gear 63 in the circumferential direction. The external tooth 63a of the external gear 63 is possibly engaged with the internal tooth 61c of the internal gear 61. The number of external teeth 63a of the external gear 63 is set to be smaller than the number of internal teeth 61c of the internal gear 61. Furthermore, a through-hole 63b is formed in the center of the external gear 63. A cylindrical upright wall portion 63c that protrudes in the direction of the internal gear 61 is formed, along an edge of an opening of a hole 63b, on an internal surface that faces the internal gear 61 of the external gear 63. An external diameter of the cylindrical upright wall portion 63c is set to be smaller than an internal diameter of the cylindrical upright wall portion 61e of the internal gear 61, and the cylindrical upright wall portion 63c, of the external gear 63 functions as a cylinder that is inserted into the cylindrical upright wall portion 61e of the internal gear 61, which is the circular hole.

As illustrated in FIG. 2, in a state where the external tooth 63a of the external gear 63 is engaged with the internal tooth 61c of the internal gear 61, a rotation axis O1 (center of the cylindrical upright wall portion 61e (circular hole)) of the internal gear 61 and a rotation axis O2 (center of the upright wall portion 63c) of the external gear 63 are different in position, are eccentric. Consequently, an eccentric annular space K is formed between an internal surface of the cylindrical upright wall portion 61e the circular hole) of the internal gear 61, and an external surface of the cylindrical upright wall portion 63c (cylinder) of the external gear 63.

As illustrated in FIGS. 1 and 2, a first wedge 71 and a second wedge 73 are movably provided along the circumferential direction in the eccentric annular space K.

The first wedge 71 and the second wedge 73 are plane symmetrically formed. An internal surface 71a of the first wedge 71 and an internal surface 73a of the second wedge 73 have an internal diameter that is approximately the same as the external diameter of the upright wall portion 63c of the external gear 63. Furthermore, each of an external surface 71b of the first wedge 71 and an external surface 73b of the second wedge 73 has a diameter larger than that of the internal surface 71a and the internal surface 73a, each of centers of the external surface 71b and the external surface 73b is different from that of the internal surface 71a and the internal surface 73a, and thicknesses of the first wedge 71 and the second wedge 73 change along the wedge shape.

Figure 10:
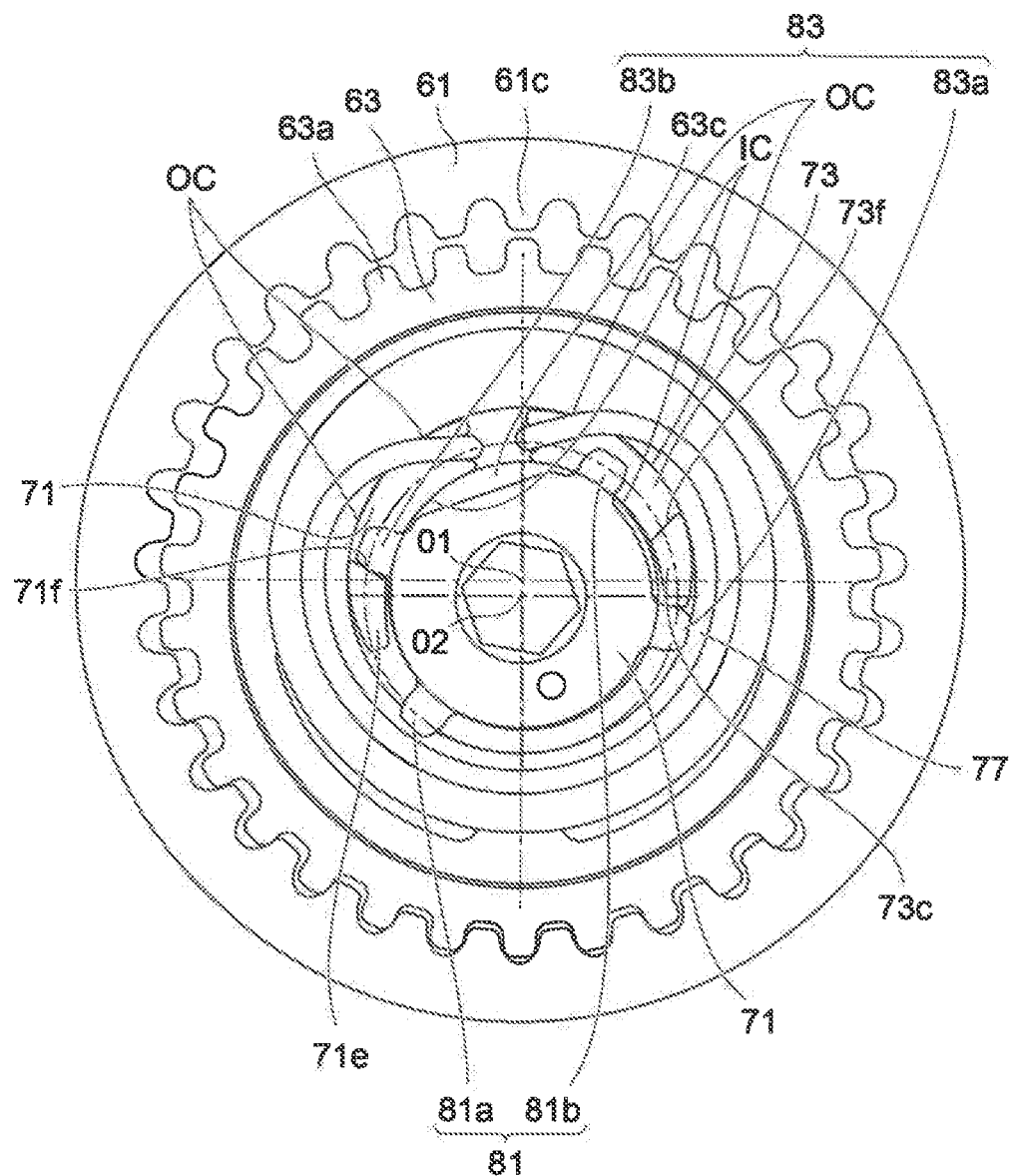
FIG. 10 is a view illustrating a wedge held in an eccentric annular space that is illustrated in FIG. 1.

In the present embodiment, as illustrated in FIG. 10 that is a view illustrating the wedge held in the eccentric annular space illustrated in FIG. 1, two outside contact points (OC) that are in contact with an internal surface of the upright wall portion 61e of the internal gear 61 are respectively formed on the external surface 71b of the first wedge 71 and the external surface 73b of the second wedge 73, and an inside contact point (IC) that is in contact with an external surface of the upright wall portion 63c of the external gear 63 is formed on the internal surface 71a of the first wedge 71 and the internal surface 73a of the second wedge 73. The inside contact point (IC) is positioned between the two outside contact points. At the point at which two OCs and one IC are in contact with one another, the first wedge 71 and the second wedge 73 are stably held in the eccentric annular space K.

When the first wedge 71 and the second wedge 73 move in a direction in which the first wedge 71 and the second wedge 73 are separated from each other, in other words, in a direction in which the wedge is pushed into the narrow-width portion of the eccentric annular space K, the internal gear 61 and the external gear 63 relatively move in a direction in which the internal tooth 61c and the external tooth 63a are engaged with each other.

The first wedge 71 and the second wedge 73 receive a biasing force from a spring 77 that attempts to return elastically in the direction of enlarging diameter, in the direction in which the first wedge 71 and the second wedge 73 are separated from each other. The spring 77 is made up of a one-turn annular portion 77a, and an end portion 77b and an end portion 77c that extend upright from the annular portion 77a. The annular portion 77a is accommodated in a groove 61g that is formed along an opening of the cylindrical upright wall portion 61e (circular hole) of the internal gear 61. The end portion 77b is engaged with a groove portion 71c that is formed on a thickness-side flank end surface of the first wedge 71, and the end portion 77c is engaged with a groove portion 73c that is formed on a thickness-side flank end surface of the second wedge 73.

A protrusion portion 71e and a protrusion portion 73e that protrude to the groove 61g side are respectively formed on the thickness sides of an upper surface 71d (surface that is exposed to the groove 61g) of the first wedge 71 and an upper surface 73d of the second wedge 73, which face the groove 61g in the internal gear 61. Therefore, portions other than the protrusion portion 71e of the upper surface 71d of the first wedge 71 and portions other than the protrusion portion 73e of the upper surface 73d of the second wedge 73 are concave portions recessed with passing though in a diameter direction. An upright wall portion of 71f of the protrusion portion 71e and an upright wall portion 73f of the protrusion portion 73e are pressed portions to which a pressing portion of a striker possibly applies pressure.

As illustrated in FIGS. 1 to 4, the striker 79 is made up of a main body portion 79d that is arranged in the groove 61g in the internal gear 61, and a cylinder portion 79e that is connected to the main body portion 79d and is fitted to the inside of the upright wall portion 63c of the external gear 63. Consequently, a rotation axis of the striker 79 is a rotation axis O2 of the external gear 63. A shape of a cross section of an internal cylinder portion of the cylinder portion 79e is a non-circle (regular hexagon in the present embodiment), and a fitting hole 79c to which a drive shaft (not illustrated) is fitted and through which rotation of the drive shaft is transferred. As illustrated in FIG. 2, a shape of a cross section of the engagement hole 79f is symmetrical with respect to a first axis A1 as a symmetrical axis that is an axis that intersects the rotation axis O2 of the striker 79.

In the present embodiment, two sets of multiple pressing portions, each of which is made up of a first protrusion portion and a second protrusion portion that possibly presses the first wedge 71 and the second wedge 73, pressing portion are formed on an outer edge of the main body portion 79d.

One pressing portion 81 of the two sets of pressing portions has a first protrusion portion 81a and a second protrusion portion 81b that protrude in a radius direction from an outer edge portion of the main body portion 79d. The striker 79 rotates clockwise in FIG. 1, and thus the first protrusion portion 81a presses an end surface of a wedge front end side of the first wedge 71 to move the first wedge 71 in a direction in which the wedge is pulled out from the narrow-width portion of the eccentric annular space K. Furthermore, the second protrusion portion 81b is superimposed on a concavity portion of the second wedge 73 and the striker 79 rotates clockwise in FIGS. 1 and 2. Thus, pressure is applied to the upright wall portion 73f of the protrusion portion 73e to move the second wedge 73 in a direction in which the wedge is pushed into the narrow-width portion of the eccentric annular space K.

The other pressing portion 83 of the two sets of pressing portions has a first protrusion portion 83a and a second protrusion portion 83b that protrude in the radius direction from the outer edge portion of the main body portion 79d. The striker 79 rotates counterclockwise in FIG. 1, and thus the first protrusion portion 83a presses an end surface of a wedge front end side of the second wedge 73 to move the second wedge 73 in the direction in which the wedge is pulled out from the narrow-width portion of the eccentric annular space K. Furthermore, the second protrusion portion 83b is superimposed on a concavity portion of the first wedge 71 and the striker 79 rotates counterclockwise in FIG. 1. Thus, pressure is applied to the upright wall portion 71f of the protrusion portion 71e to move the first wedge 71 in the direction in which the wedge is pushed into the narrow-width portion of the eccentric annular space K.

A pair of the first protrusion portion 81a and the second protrusion portion 81b that constitute the pressing portion 81 are provided in a range of 180 degrees or smaller in the rotation direction of the striker 79. In the same manner, a pair of the first protrusion portion 83a and the second protrusion portion 83b that constitute the pressing portion 83 are also provided in a range of 180 degrees or smaller in the rotation direction of the striker 79.

As illustrated in FIG. 2, within a rotation plane of the striker 79, there are four areas (area E1 to area E4 in FIG. 2) that are partitioned by two axes (first axis A1 and second axis A2 in FIG. 2) that intersect the rotation axis O2 of the striker 79 and intersect each other. The first protrusion portion 81a of the pressing portion 81 is positioned in one area (area E1) of two areas (area E1 and area E3) that have opposite angles, and the second protrusion portion 81b of the pressing portion 81 is positioned in the other area the area E3). Furthermore, the first protrusion portion 83a of the pressing portion 83 is positioned in one area (area E2) of two areas (area E2 and area E4) that have opposite angles, and the second protrusion portion 83b of the pressing portion 83 is positioned in the other area (area E4).

Figure 8:
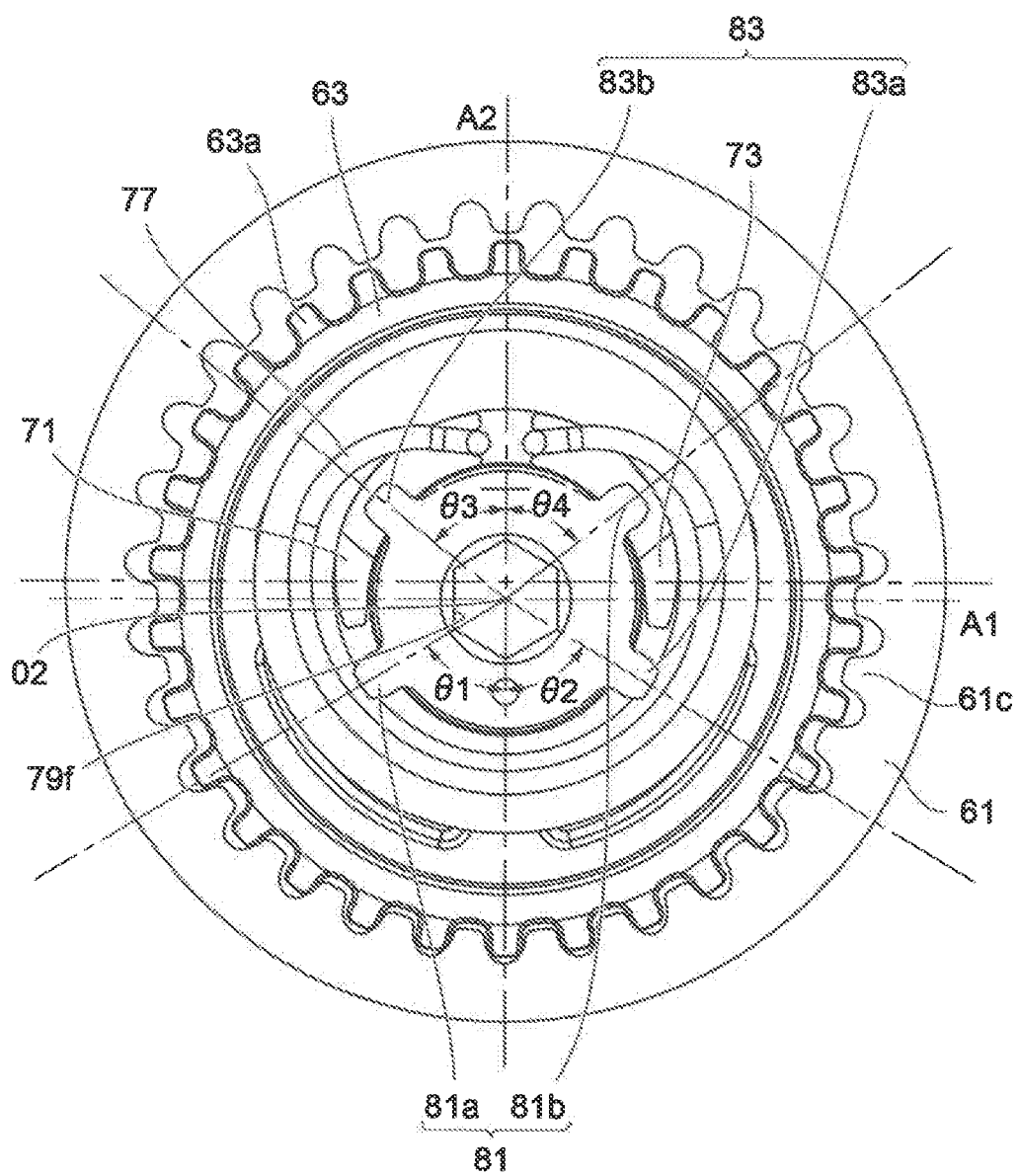
FIG. 8 is a configuration view of the reclining device illustrated in FIG. 2 and explains a striker that is in operation when a wedge lock position is high.

As illustrated in FIG. 8 that is a configuration view of the reclining device illustrated in FIG. 2, in the two sets of pressing portion 81 and the pressing portion 83, an angle at which a straight line that connects the first protrusion portion 81a (center portion of the protrusion portion in the circumferential direction) of one pressing portionpressing portion 81 and the center (rotation axis) O2 of the engagement hole 79f, and the second axis A2 intersect each other is set to θ1, an angle at which a straight line that connects the first protrusion portion 83a (center portion of the protrusion portion in the circumferential direction) of the other pressing portionpressing portion 83 and the center of the engagement hole 79f, and the second axis A2 intersect each other is set to θ2, an angle at which a straight line that connects the second protrusion portion 83b (center portion of the protrusion portion in the circumferential direction) of the other pressing portionpressing portion 83 and the center of the engagement hole 79f, and the second axis A2 intersect each other is set to θ3, and an angle at which a straight line that connects the second protrusion portion 81b of the one pressing portionpressing portion 81 and the center of the engagement hole 79f, and the second axis A2 intersect each other is set to θ4. Under the conditions, followings are satisfied.

θ1=θ2

θ3=θ4

θ1=θ2≠θ3=θ4

Moreover, θ1=θ2>θ3=θ4 is satisfied.

By satisfying θ1=θ2 and θ3=θ4, although the striker 79 illustrated in FIGS. 1 to 4 and 8 rotates by 180 degrees to change a position therefrom, it is possible to apply pressure to the first wedge 71 and the second wedge 73, and thus the first wedge 71 and the second wedge 73 can move.

Figure 9:
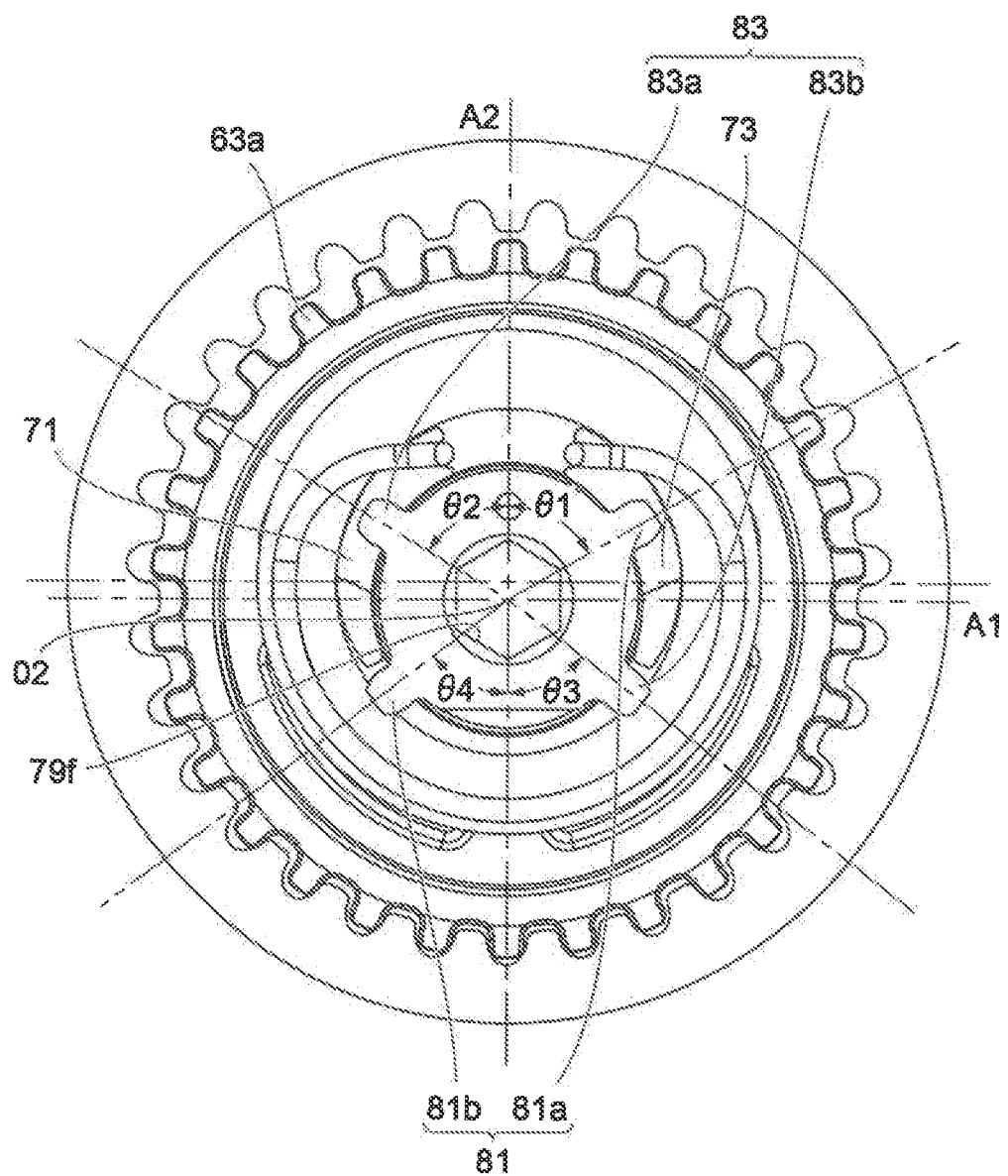
FIG. 9 is a configuration view of the reclining device illustrated in FIG. 2 and explains the striker that is in operation when the wedge lock position is low.

At that time, since θ1=θ2>θ3=θ4, as illustrated in FIG. 8, in a case where a wedge lock position is high, the first protrusion portion 81a of the pressing portion 81 and the first protrusion portion 83a of the pressing portion 83, which respectively have a large angle θ1 and angle θ2 at which the straight line that connects the protrusion portion and the center of the engagement hole 79f, and the second axis A2 intersect each other, may be set to press the end surfaces of the wedge front ends of the first wedge 71 and the second wedge 73. Furthermore, as illustrated in FIG. 9, in a case where the wedge lock position is low, the second protrusion portion 81b of the pressing portion 81 and the second protrusion portion 83b of the pressing portion 83 which respectively have a small angle θ3 and angle θ4 at which the straight line that connects the protrusion portion and the center of the engagement hole 79f, and the second axis A2 intersect each other, may be set to press the end surfaces of the wedge front ends of the first wedge 71 and the second wedge 73.

The shape of the cross section of the fitting hole 79f is symmetrical with respect to the first axis A1 as a symmetrical axis. Although the striker 79 rotates by 180 degrees from a state of the striker 79 illustrated in FIGS. 1 to 4, and 8 to change a position thereof, the drive shaft can be engaged without hindrance without a change of the shape of the engagement hole 79f.

First, as illustrated in FIG. 10, in the present embodiment, the upright wall portion 71f of the protrusion portion 71e of the first wedge 71, and the upright wall portion 73f of the protrusion portion 73e of the second wedge 73, which are the pressed portions which the pressing portion of the striker 79 presses, are inclination surfaces that are inclined in the longitudinal direction of the wedge. In a state being pressed by the pressing portion of the striker 79, the first wedge 71 and the second wedge 73 comes into press-contact with either the internal surface of the cylindrical upright wall portion 61e (circular hole) of the internal gear 61, or the external surface of the cylindrical upright wall portion 63c (cylinder) of the external gear 63.

In the present embodiment, the pressure application of the striker 79 is set to press the upright wall portion 71f of the protrusion portion 71e of the first wedge 71 at a position that is distant from a middle portion in the diameter direction, and the upright wall portion 73f of the protrusion portion 73e of the second wedge 73 at a position that is distant from a middle portion in the diameter direction.

Furthermore, in the present embodiment, the first wedge 71 and the second wedge 73 are set to come into press-contact with the internal surface of the cylindrical upright wall portion 61e (circular hole) of the internal gear 61, which is on the seat cushion 53 side where the first wedge 71 and the second wedge 73 do not eccentrically rotate.

The inclination surface may be formed not only on the upright wall portion 71f of the protrusion portion 71e of the first wedge 71 and the upright wall portion 73f of the protrusion portion 73e of the second wedge 73, but also on the pressing portion of the striker 79 that makes the upright wall portion 71f and the upright wall portion 73f be in press-contact state. That is, the inclination surface may be formed on at least either the upright wall portion of the wedge or the pressing portion of the striker 79.

As illustrated in FIGS. 1, 2, and 3, the internal gear 61 and the external gear 63 are attached to each other through a connection ring 91 such that the internal gear 61 and the external gear 63 cannot relatively move in the axis direction.

Next, an operation according to the configuration described above will be described with reference to FIGS. 2, 5, and 6.

Locked State: Non-Operating State

As illustrated in FIG. 2, the first wedge 71 and the second wedge 73 receive a biasing force from the spring 77 in direction in which the first wedge 71 and the second wedge 73 are separated from each other, and press to the external surface of the upright wall portion 63c of the external gear 63 and the internal surface of the cylindrical upright wall portion 61e (circular hole) of the internal gear 61.

The first wedge 71 and the second wedge 73 respectively press to the external surface of the upright wall portion 63c of the external gear 63 and the internal surface of the cylindrical upright wall portion 61e (circular hole) of the internal gear 61 to bias the internal gear 61 and the external gear 63 in the direction in which an amount of eccentricity between the rotation axes of both likely to increase, and the internal tooth 61c of the internal gear 61 and the external tooth 63a of the external gear 63 are fully engaged with each other, and thus the seat back 55 is not tilted.

Unlocked State: Operating State

Figure 5:
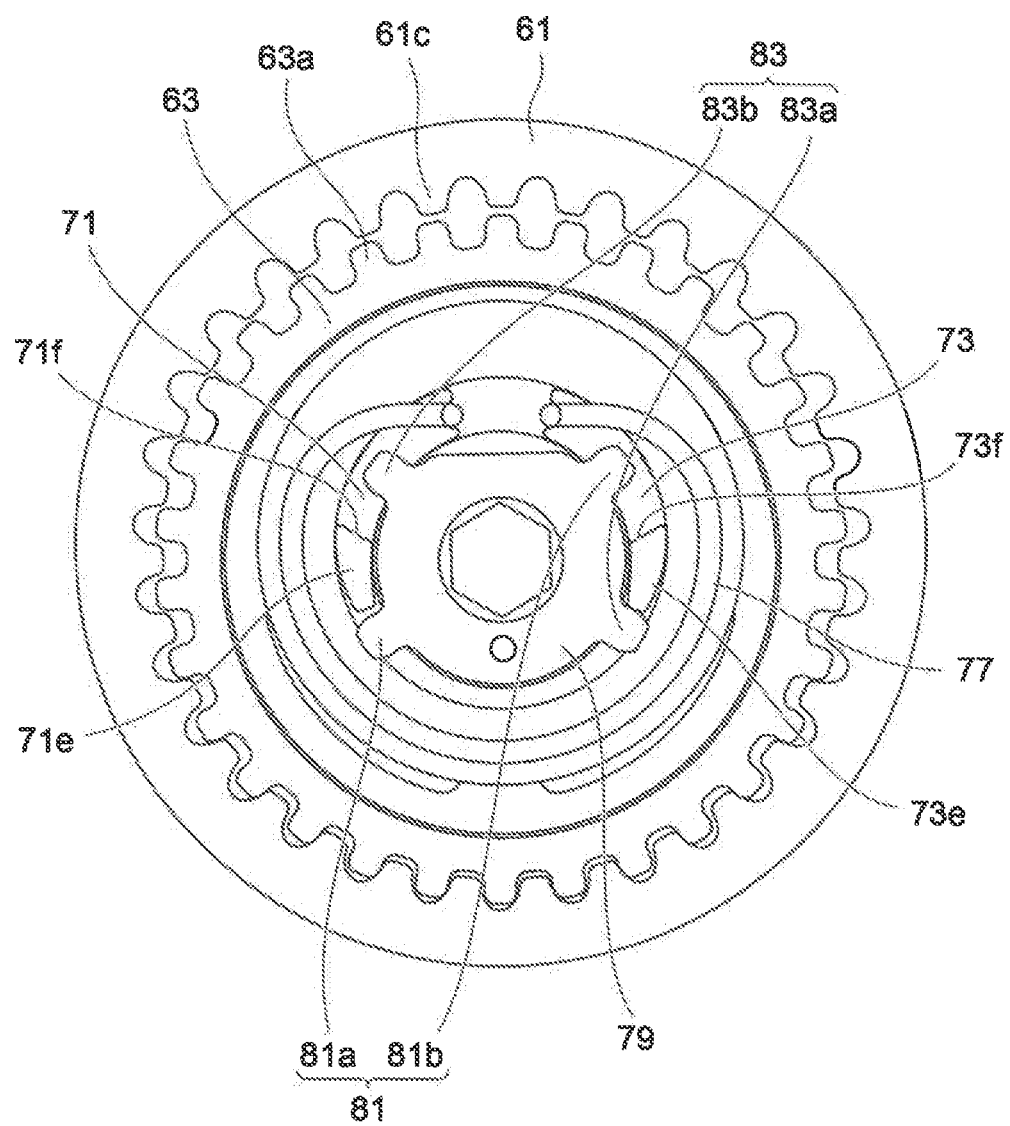
FIG. 5 is a view illustrating operation of the reclining device illustrated in FIG. 1.

As illustrated in FIG. 5, in the locked state, when the drive shaft (not illustrated) is driven to rotate in the rightward direction or the leftward direction by pressing an operation button or operating an operation handle, the striker 79 rotates in the rightward direction or the leftward direction. As an example, in FIGS. 5 and 6, when the striker 79 rotates counterclockwise, the first protrusion portion 83a of the pressing portion 83 of the striker 79 presses to the end surface of the wedge front end side of the second wedge 73 to move the second wedge 73 from the narrow-width portion of the eccentric annular space K in the direction in which the wedge is pulled out.

In a case where a load that imposed the seat back 55 is small, as illustrated in FIG. 5, when with the striker 79 presses the second wedge 73 to move, a pressing force to make the second wedge 73 be into press-contact with the external surface of the upright wall portion 63c of the external gear 63 of the second wedge 73 and the internal surface of the cylindrical upright wall portion 61e (circular hole) of the internal gear 61 is reduced, and the engagement between the internal tooth 61c of the internal gear 61 and the external tooth 63a of the external gear 63 is loosened. Thus, the seat back is in a state where the tilting is possible.

When the second wedge 73 starts to move, the first wedge 71 stops due to friction between the external surface of the upright wall portion 63c of the external gear 63, and the internal surface of the cylindrical upright wall portion 61e (circle-shapes hole) of the internal gear 61. However, when the second wedge 73 moves in the direction in which the wedge is pulled out, due to an elastic repulsion force of the spring 77, the first wedge 71 moves in the direction in which the wedge is pushed into the eccentric annular space K. By repeating the operation, an engagement part changes and the seat back is tilted while retaining the state of eccentricity between the internal gear 61 and the external gear 63.

Figure 6:
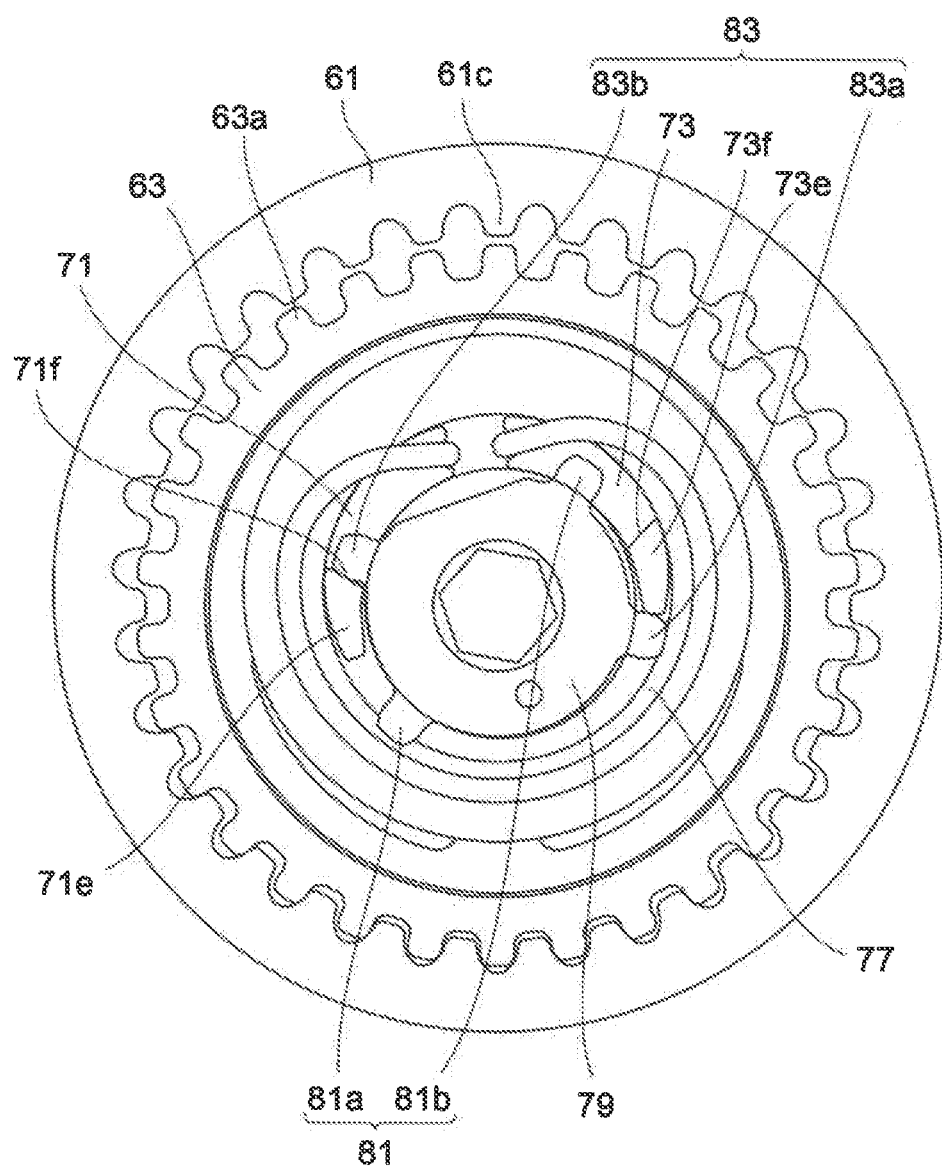
FIG. 6 is a view illustrating the operation of the reclining device illustrated in FIG. 1.

In a case where the load imposed on the seat back 55 is large, friction between the first wedge 71 and each of the external surface of the upright wall portion 63c of the external gear 63 and the internal surface of the cylindrical upright wall portion 61e (circular hole) of the internal gear 61 is large, and the first wedge 71 is not tilted only by the elastic repulsion force of the spring 77. In this case, as illustrated in FIG. 6, the striker 79 further rotates counterclockwise, the second protrusion portion 83b of the pressing portion 83 presses the upright wall portion 71f of the protrusion portion 73e of the first wedge 71, and the first wedge 71 moves in the direction in which the wedge is pushed into the eccentric annular space K.

With this operation, the engagement part changes and the seat back 55 is tilted while retaining the state of eccentricity between the internal gear 61 and the external gear 63. With this configuration, the following effects are obtained.

(1) the upright wall portion 71f of the protrusion portion 71e of the first wedge 71, and the upright wall portion 73f of the protrusion portion 73e of the second wedge 73, which are the pressed portions which the pressing portion of the striker 79 presses, are inclination surfaces that are inclined with respect to the wedge in the longitudinal direction. When the pressing portion of the striker 79 presses the upright wall portion 71f and the upright wall portion 73f, the inclination surface make that the first wedge 71 and the second wedge 73 come into press-contact with either the internal surface of the cylindrical upright wall portion 61e (circular hole) of the internal gear 61, or the external surface of the cylindrical upright wall portion 63c (cylinder) of the external gear 63. Thus the first wedge 71 and the second wedge 73 are inclined in the same direction, and the reclining device can stably operate without any change in the operation due to the difference in the inclination direction.

(2) The first wedge 71 and the second wedge 73 are set to come into press-contact with the internal surface of the cylindrical upright wall portion 61e (circular hole) of the internal gear 61 on the seat cushion 53 side where the internal surface of the upright wall portion 61e does not eccentrically rotate.

(3) The pressure application of the striker 79 is set to press the upright wall portion 71f of the protrusion portion 71e of the first wedge 71 and the upright wall portion 73f of the protrusion portion 73e of the second wedge 73 at the position that is distant from the middle portion in the diameter direction. Thus, the first wedge 71 and the second wedge 73 are easy to be tilted.

(4) Since the second protrusion portion 81b and the second protrusion portion 83b prevent the first wedge 71 and the second wedge 73 from being lifted, there is no need to separately provide a wedge lifting-prevention member (part) to the striker.

(5) When the upright wall portion 71f (pressure-applied portion) of the protrusion portion 71e of the first wedge 71, and the upright wall portion 73f (pressed portion) of the protrusion portion 73e of the second wedge 73 are pressed, the first wedge 71 and the second wedge 73 move in the direction in which the wedge is pushed into the narrow-width portion of the eccentric annular space K, and the end surfaces of wedge front end sides of the first wedge 71 and the second wedge 73 are pressed, the first wedge 71 and the second wedge 73 move in the direction in which the wedge is pulled out from the narrow-width portion of the eccentric annular space K. Thus, the preferable formability of the wedge is achieved compare to a case where the pressure-applied surfaces, which respectively moves the wedge in the directions in which the wedge is pushed into or is pulled out from the narrow-width portion of the eccentric annular space K, are provided on a concave portion of the wedge.

This disclosure is not limited to the embodiment described above. Regarding the pressing portion in the embodiment described above, two pressing portions 81 and 83 are provided, but three or more pressing portions may be provided.

Furthermore, the external gear may be provided on the seat cushion side, and the internal gear may be provided on the seat back side.

A cylinder may be formed in the internal gear, and a circular hole may be formed in the external gear.

Second Embodiment

A striker, a first wedge, and a second wedge in the present embodiment are different from the striker, the first wedge, and the second wedge in the first embodiment. Since the other components are the same as those in the first embodiment, the same components are given the same reference numeral, and are not repeatedly described.

Figure 11:
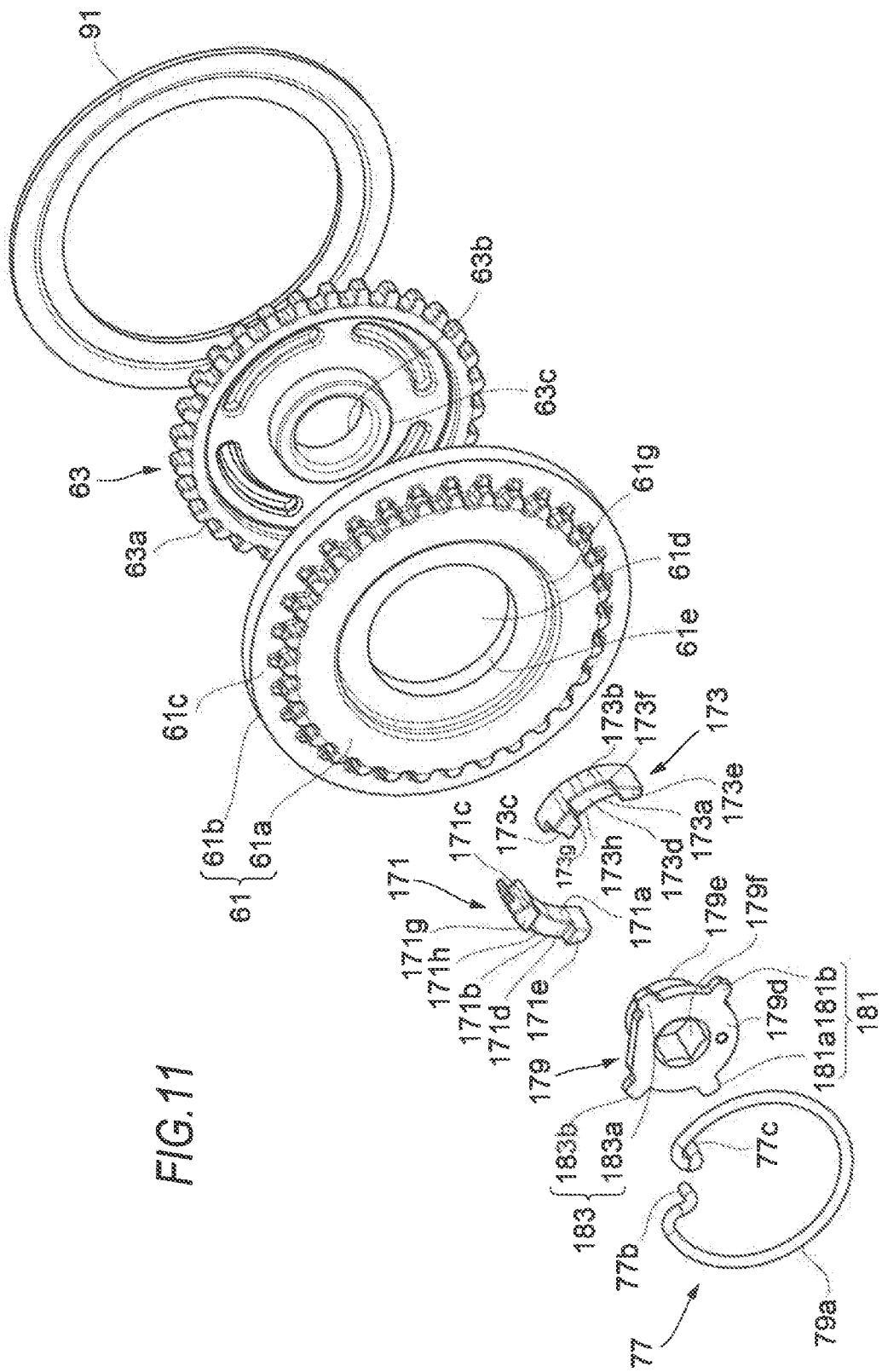
FIG. 11 is an exploded perspective view of a reclining device according to a second embodiment.
Figure 12:
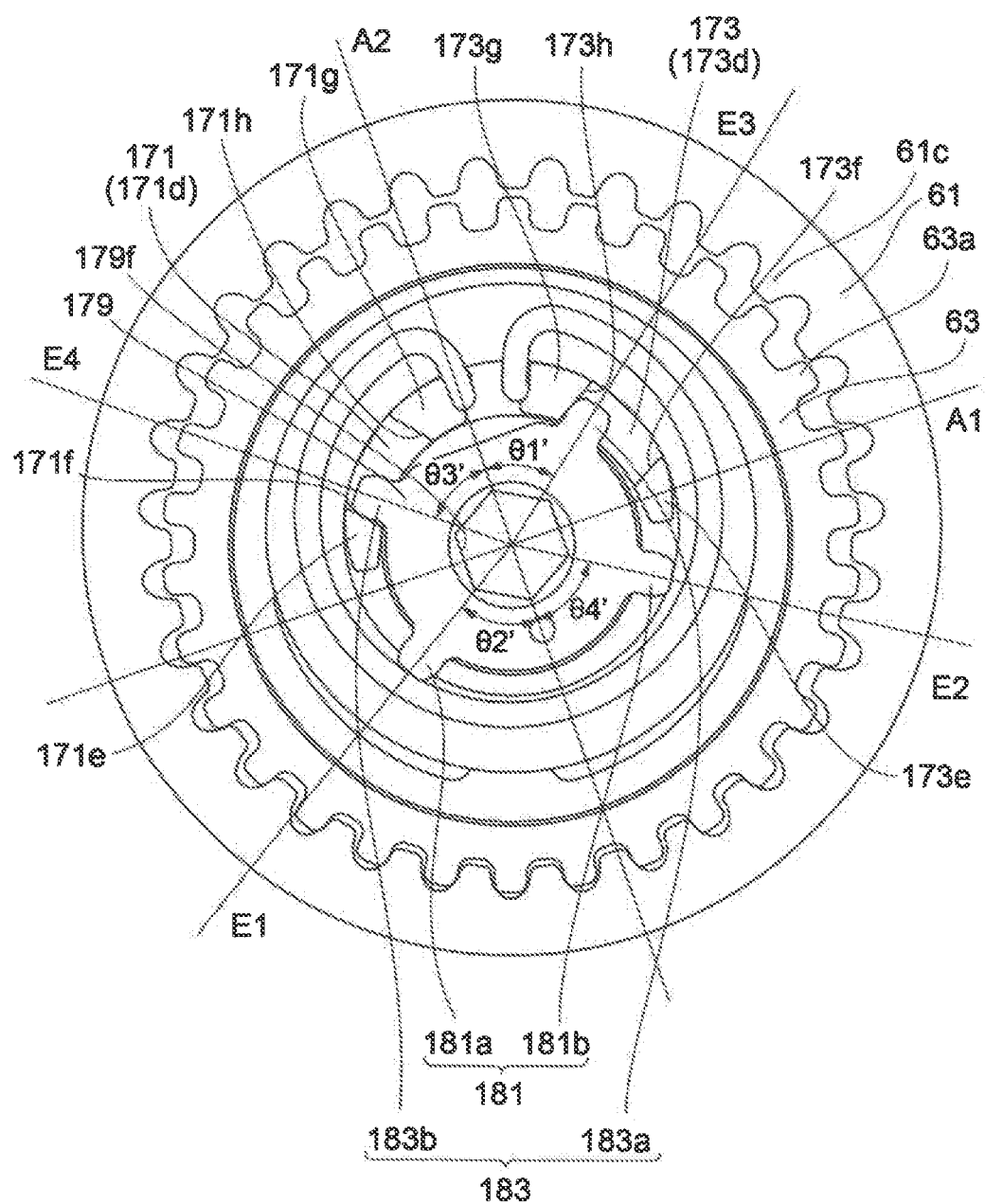
FIG. 12 is a view illustrating the operation of the reclining device illustrated in FIG. 11.

As illustrated in FIGS. 11 and 12, a first wedge 171 and a second wedge 173 are movably provided along the circumferential direction in the eccentric annular space K.

Each of the first wedge 171 and the second wedge 173 has a plane symmetrical shape. An internal surface 171a of the first wedge 171 and an internal surface 173a of the second wedge 173 have an internal diameter that is approximately the same as the external diameter of the upright wall portion 63c of the external gear 63. Furthermore, an external surface 171b of the first wedge 171 and an external surface 173b of the second wedge 173 respectively have a diameter larger than that of the internal surface 171a and the internal surface 173a and thicknesses of the first wedge 171 and the second wedge 173 change along the wedge shape.

As in the first embodiment, in the present embodiment, two outside contact points that are in contact with the internal surface of the upright wall portion 61e of the internal gear 61 are formed on the external surface 171b of the first wedge 171 and the external surface 173b of the second wedge 173, and one inside contact point that is in contact with an external surface of the upright wall portion 63c of the external gear 63 is formed on the internal surface 171a of the first wedge 171 and the internal surface 173a of the second wedge 173. The inside contact point is positioned between the outside contact points. At the point at which the two outside contact points and one inside contact point are in contact with one another, the first wedge 171 and the second wedge 173 are stably held ion the eccentric annular space K.

When the first wedge 171 and the second wedge 173 move in a direction in which the first wedge 171 and the second wedge 173 are separated from each other, in other words, in the direction in which the wedge is pushed into the narrow-width portion of the eccentric annular space K, the internal gear 61 and the external gear 63 relatively move in the direction in which the internal tooth 61c and the external tooth 63a are engaged with each other.

The first wedge 171 and the second wedge 173 receive a biasing force from the spring 77 that attempts to return elastically in the direction of enlarging diameter, in the direction in which the first wedge 171 and the second wedge 173 are separated from each other. The spring 77 is made up of a one-turn annular portion 77a, and an end portion 77b and an end portion 77c that extend upright from the annular portion 77a. The end portion 77b is engaged with a groove portion 171c that is formed on a thickness-side flank end surface of the first wedge 171, and the end portion 77c is engaged with a groove portion 173c that is formed on a thickness-side flank end surface of the second wedge 173.

A protrusion portion 171e and a protrusion portion 173e that protrude to the groove 61g side are respectively formed on the thickness sides of an upper surface 171d (surface that is exposed to the groove 61g) of the first wedge 171 and an upper surface 173d of the second wedge 173, which face the groove 61g in the internal gear 61. A protrusion portion 171g and a protrusion portion 173g that protrude to the groove 61g are respectively formed on the thickness sides of the upper surface 171d of the first wedge 171 and the upper surface 173d of the second wedge 173.

Therefore, portions other than the protrusion portion 171e, the protrusion portion 171g of the upper surface 171d of the first wedge 171 and portions other than the protrusion portion 173e and the protrusion portion 173g of the upper surface 173d of the second wedge 173 are concave portions recessed with passing though in the diameter direction. An upright wall portion 171f of the protrusion portion 171e, an upright wall portion 173f of the protrusion portion 173e, an upright wall portion 171h of the protrusion portion 171g, and an upright wall portion 173h of the protrusion portion 173g are pressed portions which a pressing portion of the striker 179 possibly presses.

A difference between the striker 179 according to the present embodiment and the striker 79 according to the first the embodiment is a position of the protrusion portion of the pressing portion. Two pressing portions, each of which is made up of the first protrusion portion and the second protrusion portion that possibly presses the first wedge 171 and the second wedge 173 are formed on the striker 179 according to the present embodiment, similarly to the first embodiment.

As illustrated in FIG. 12, within the rotation plane of the striker 179, there are the four areas (area E1 to area E4 in FIG. 12) that are partitioned by two axes (first axis A1 and second axis A2 in FIG. 12) that intersect the rotation axis O2 of the striker 179 and intersect each other. A first protrusion portion 183a of pressing portion the pressing portion 183 is positioned in one area (area E3) of the area E3 and the area E4 that are adjacent to each other, and a second protrusion portion 183b of the pressing portion 183 is positioned in the other area (area E4). Furthermore, a second protrusion portion 181b of the other pressing portion, pressing portion 181 is positioned in one area (area E2) the area E1 and the area E2 that are adjacent to each other and a first protrusion portion 181a of the pressing portion 181 is positioned in the other area (area E1).

As illustrated in FIG. 12, in two sets of the pressing portion 181 and the pressing portion 183, an angle at which a straight line that connects the first protrusion portion 183a of one pressing portionpressing portion 183 and the center (rotation axis) O2 of an engagement hole 179f, and the second axis A2 intersect each other is set to θ1', an angle at which a straight line that connects the first protrusion portion 181a of the other pressing portionpressing portion 181 and the center of the engagement hole 179f, and the second axis A2 intersect each other is set to θ2', an angle at which a straight line that connects a second protrusion portion 183b of the one pressing portionpressing portion 183 and the center of the engagement hole 179f, and the second axis A2 intersect each other is set to θ3', and an angle at which a straight line that connects the second protrusion portion 181b of the other application portion 181 and the center of the engagement hole 179f, and the second axis A2 intersect each other is set to θ4'. Under the condition, followings are satisfied.

θ1'=θ3'

θ2'=θ4'

θ1'=θ3'≠θ2'=θ4'

Moreover, θ1'=θ3'<θ2'=θ4' is established.

When the striker 179 rotates counterclockwise, the first protrusion portion 183a presses to the upright wall portion 171h of the protrusion portion 173g of the second wedge 173, and the second wedge 173 moves in the direction in which the wedge is pulled out from the narrow-width portion of the eccentric annular space K. Furthermore, the second protrusion portion 183b presses the upright wall portion 171f of the protrusion portion 171e of the first wedge 171, and the first wedge 171 moves in the direction in which the wedge is pushed into the narrow-width portion of the eccentric annular space K. Conversely, in FIG. 12, when the striker 179 rotates clockwise, the first protrusion portion 183a presses the upright wall portion 173f of the protrusion portion 173e of the second wedge 173, and the second wedge 173 moves in the direction in which the wedge is pushed into the narrow-width portion of the eccentric annular space K. Furthermore, the second protrusion portion 183b presses the upright wall portion 171f of the protrusion portion 171g of the first wedge 171, and the first wedge 171 moves in the direction in which the wedge is pulled out from the narrow-width portion of the eccentric annular space K.

By satisfying θ1'=θ3' and θ2'=θ4', although the striker 179 illustrated in FIG. 12 rotates by 180 degrees to change a position therefrom, it is possible to press to the first wedge 171 and the second wedge 173, and thus the first wedge 71 and the second wedge 73 can move.

In this case, when the striker 179 rotates counterclockwise, the first protrusion portion 181a presses the upright wall portion 173h of the protrusion portion 173g of the second wedge 173, and the first wedge 171 moves in the direction in which the wedge is pulled out from the narrow-width portion of the eccentric annular space K. Furthermore, the second protrusion portion 181b presses to the upright wall portion 171f of the protrusion portion 171e of the first wedge 171, and the first wedge 171 moves in the direction in which the wedge is pushed into the narrow-width portion of the eccentric annular space K. Conversely, when the striker 179 rotates clockwise, the first portion 181a presses the upright wall portion 173f of the protrusion portion 173e of the second wedge 173, and the second wedge 173 moves in the direction in which the wedge is pushed into the narrow-width portion of the eccentric annular space K. Furthermore, the second protrusion portion 181b presses to the upright wall portion 171h of the protrusion portion 171g of the first wedge 171, and the first wedge 171 moves in the direction in which the wedge is pulled out from the narrow-width portion of the eccentric annular space K.

At that time, since θ1'=θ3'<θ2'=θ4' is satisfied, in a case where the wedge lock position is high, the first protrusion portion 183a and the second protrusion portion 183b of the pressing portion 183, which respectively have a small angle θ1' and angle θ3' at which the straight line that connects the protrusion portion and the center of the engagement hole 179f, and the second axis A2 intersect each, other may be set to press the first wedge 171 and the second wedge 173 to move. Furthermore, in a case where the wedge lock position is low, the first protrusion portion 181a and the second protrusion portion 181b of the pressing portion 181 which respectively have a large angle θ2' and angle θ4' at which the straight line that connects the protrusion portion and the center of the engagement hole 179f, and the second axis A2 intersect each other, may be set to press the first wedge 171 and the second wedge 173 to move.

Operation of the reclining device with this configuration will be described.

Locked State: Non-Operating State

The first wedge 171 and the second wedge 173 receive a biasing force from the spring 77 in direction in which the first wedge 171 and the second wedge 173 are separated from each other, and press the external surface of the upright wall portion 63c of the external gear 63 and the internal surface of the cylindrical upright wall portion 61e (circular hole) of the internal gear 61.

The first wedge 171 and the second wedge 173 respectively press the external surface of the upright wall portion 63c of the external gear 63 and the internal surface of the cylindrical upright wall portion 61e (circular hole) of the internal gear 61 to bias the internal gear 61 and the external gear 63 in the direction in which an amount of eccentricity between the rotation axes of both is likely to increase, and the internal tooth 61c of the internal gear 61 and the external tooth 63a of the external gear 63 are fully engaged with each other, and thus the seat back 55 is not tilted.

Unlocked State: Operating State

In the locked state, when the drive shaft (not illustrated) is driven to rotate in the rightward direction or the leftward direction by pressing the operation button or operating the operation handle, the striker 179 rotates in the rightward direction or the leftward direction. When the striker 179 rotates counterclockwise in FIG. 11, the first protrusion portion 183a of the pressing portion 183 of the striker 179 presses the upright wall portion 173h of the second wedge 173 and the second wedge 173 moves in the direction in which the wedge is pulled out from the narrow-width portion of the eccentric annular space K.

In a case where the load imposed on the seat back 55 is small, when the striker 179 presses the second wedge 173 to move, the pressing force to make the second wedge 173 be into press-contact with the external surface of the upright wall portion 63c of the external gear 63 of the second wedge 173 and the internal surface of the cylindrical upright wall portion 61e (circular hole) of the internal gear 61 is reduced, and the engagement between the internal tooth 61c of the internal gear 61 and the external tooth 63a of the external gear 63 is loosened. Thus, the seat back is in a state where the tilting is possible.

When the second wedge 173 starts to move, the first wedge 171 stops due to friction between the external surface of the upright wall portion 63c of the external gear 63, and the internal surface of the cylindrical upright wall portion 61e (circular hole) of the internal gear 61. However, when the second wedge 173 moves in the direction in which the wedge is pulled out, due to the elastic repulsion force of the spring 77, the first wedge 171 moves in the direction in which the wedge is pushed into the eccentric annular space K. By repeating the operation, an engagement part changes and the seat back is tilted while retaining the state of eccentricity between the internal gear 61 and the external gear 63.

In a case where the load imposed on the seat back 55 is large, friction between the first wedge 171 and each of the external surface of the upright wall portion 63c of the external gear 63 and the internal surface of the cylindrical upright wall portion 61e (circular hole) of the internal gear 61, is large, and the first wedge 171 is not tilted only by the elastic repulsion force of the spring 77. In this case, as illustrated in FIG. 12, the striker 179 further rotates counterclockwise, the second protrusion portion 183b of the pressing portion 183 presses the upright wall portion 171f of the protrusion portion 171e of the first wedge 171, and the first wedge 171 moves in the direction in which the wedge is pushed into the eccentric annular space K.

With this operation, the engagement part changes and the seat back 55 is tilted while retaining the state of eccentricity between the internal gear 61 and the external gear 63.

With this configuration, various effects that are the same as those which are obtained in the first embodiment can also be obtained.

What is claimed is:
1. A reclining device comprising:
an internal gear, which includes internal teeth on an internal circumferential surface and is provided on a member that is on one of a seat cushion side and a seat back side, wherein the internal gear is formed with one of a circular hole and a cylinder;
an external gear, which includes external teeth which are engaged with the internal teeth of the internal gear, are provided on an external circumferential surface, and whose number is smaller than the number of the internal teeth, is provided on a member that is on an other of the seat cushion side and the seat back side, wherein in a case where the circular hole is formed in the internal gear, the external gear is formed with a cylinder that is inserted into the circular hole, and in a case where the cylinder is formed in the internal gear, the external gear is formed with a circular hole that is inserted into the cylinder;
a first wedge and a second wedge, which are movably provided along a circumferential direction in an eccentric annular space between an internal surface of the circular hole and an external surface of the cylinder;
a biasing member, which biases the first wedge and the second wedge in a direction of a narrow-width portion of the eccentric annular space; and
a striker, which has a pressing portion capable of pressing the first wedge and the second wedge,
wherein a concave portion that is recessed in an axial direction is formed on the first wedge and the second wedge, wherein the pressing portion of the striker is superimposed, in the axial direction, on a bottom surface of the concave portion, and wherein the pressing portion presses a pressed portion that is provided on the concave portion on at least one of the first wedge and the second wedge to move the one of the first wedge and the second wedge in a direction in which the wedge is pulled out from the narrow-width portion of the eccentric annular space or in a direction in which the wedge is pushed into the narrow-width portion of the eccentric annular space.

2. The reclining device according to claim 1, wherein the pressed portions of each of the first wedge and the second edge comprise upright wall portions that face the circumferential direction in the concave portion, wherein when the upright wall portion is pressed, the first wedge and the second wedge move in a direction in which the first wedge and the second wedge are pushed into the narrow-width portion of the eccentric annular space, and wherein when end surfaces on wedge front end sides of the first wedge and the second wedge are pressed, the first wedge and the second wedge move in a direction in which the first wedge and the second wedge are pulled out from the narrow-width portion of the eccentric annular space.

3. The reclining device according to claim 2, wherein an internal surface of the first wedge and an internal surface of the second wedge have an internal diameter that is the same as an external diameter of the upright wall portions of the external gear.

4. The reclining device according to claim 1, wherein the striker includes a first protrusion portion capable of pressing one of the first wedge and the second wedge in a direction in which the one of the first wedge and the second wedge is pulled out from the narrow-width portion of the eccentric annular space, and a second protrusion portion capable of pressing the pressed portion of the other of the first wedge and the second wedge and pushing the other wedge into the narrow-width portion of the eccentric annular space, wherein an inclination surface is provided on at least one of the pressed portion of the other wedge and the second protrusion portion of the striker, and wherein the inclination surface is inclined, in a state being pressed, such that the other wedge is into press-contact with one of the internal surface of the circular hole and the external surface of the cylinder.

5. The reclining device according to claim 4, wherein the inclination surface is provided on at least one of the one wedge and the first protrusion portion of the striker, the inclination surface being inclined, in a state being pressed, such that the one wedge and the other wedge are inclined in the same direction.

6. The reclining device according to claim 4, wherein the other wedge comes into press-contact with one surface of the internal surface of the circular hole and the external surface of the cylinder which does not eccentrically move.

7. The reclining device according to claim 4, wherein the second protrusion portion presses the wedge at a position that is distant from a middle portion of the pressed portion in the axial direction.

8. The reclining device according to claim 1, wherein the first wedge and the second wedge are plane symmetrically formed.

9. The reclining device according to claim 1, wherein each of an external surface of the first wedge and an external surface of the second wedge has a diameter greater than that of the internal surface of the first wedge and the internal surface of the second wedge, each of the centers of the external surface of the first wedge and the external surface of the second wedge is different from that of the internal surface of the first wedge and the internal surface of the second wedge, and a thicknesses of the first wedge and the second wedge change along the wedge shape.

10. The reclining device according to claim 1, wherein the striker includes a pair of a first protrusion portion and a second protrusion portion that are provided in a range of 180 degrees or less in a rotation direction of the striker.

11. The reclining device according to claim 10, wherein the pressing portion includes a pair of a first protrusion portion and a second protrusion portion that are provided in a range of 180 degrees or less in the rotation direction of the striker.

12. The reclining device according to claim 11, wherein a first area, a second area, a third area, and a fourth area are included within the rotation plane of the striker that is partitioned by two axes that intersect a rotation axis of the striker and intersect each other, and wherein the first protrusion portion of the pressing portion is positioned in one area of the first area and the third area that have opposite angles, and wherein the second protrusion portion of the pressing portion is positioned in an other area of the first area and the third area.

13. The reclining device according to claim 11, wherein, in a view of the pair of the first protrusion portion and the second protrusion portion of the pressing portion and the pair of the first protrusion portion and the second protrusion portion of the striker, an angle at which a straight line that connects the first protrusion portion of the pressing portion and a rotation axis of the engagement hole, and a second axis intersect each other is set to $\theta1$, an angle at which a straight line that connects the first protrusion portion of the striker and the center of the engagement hole, and the second axis intersect each other is set to $\theta2$, an angle at which a straight line that connects the second protrusion portion of the pressing portion and the center of the engagement hole, and the second axis intersect each other is set to $\theta3$, and an angle at which a straight line that connects the second protrusion portion of the striker and the center of the engagement hole, and the second axis intersect each other is set to $\theta4$, and wherein $\theta1=\theta2\neq\theta3=\theta4$ is satisfied.

14. The reclining device according to claim 11, wherein, in a view of the pair of the first protrusion portion and the second protrusion portion of the pressing portion and the pair of the first protrusion portion and the second protrusion portion of the striker, an angle at which a straight line that connects the first protrusion portion of the pressing portion and a rotation axis of the engagement hole, and a second axis intersect each other is set to $\theta1$, an angle at which a straight line that connects the first protrusion portion of the striker and the center of the engagement hole, and the second axis intersect each other is set to $\theta2$, an angle at which a straight line that connects the second protrusion portion of the pressing portion and the center of the engagement hole, and the second axis intersect each other is set to $\theta3$, and an angle at which a straight line that connects the second protrusion portion of the striker and the center of the engagement hole, and the second axis intersect each other is set to $\theta4$, and wherein $\theta1=\theta2>\theta3=\theta4$ is satisfied.

15. A reclining device comprising:
an internal gear, which includes internal teeth on an internal circumferential surface and is provided on a member that is on one of a seat cushion side and a seat back side, wherein the internal gear is formed with one of a circular hole and a cylinder;
an external gear, which includes external teeth which are engaged with the internal teeth of the internal gear, are provided on an external circumferential surface, and whose number is smaller than the number of the internal teeth, is provided on a member that is on an other of the seat cushion side and the seat back side, wherein in a case where the circular hole is formed in the internal gear, the external gear is formed with a cylinder that is inserted into the circular hole, and in a case where the cylinder is formed in the internal gear, the external gear is formed with a circular hole that is inserted into the cylinder;
a first wedge and a second wedge, which are movably provided along a circumferential direction in an eccentric annular space between an internal surface of the circular hole and an external surface of the cylinder;
a biasing member, which biases the first wedge and the second wedge in a direction of a narrow-width portion of the eccentric annular space; and
a striker, which includes a pressing portion capable of pressing the first wedge and the second wedge,
wherein a concave portion that is recessed in an axial direction is formed on the first wedge and the second wedge,
wherein the pressing portion of the striker is superimposed, in the axial direction, on a bottom surface of the concave portion,
wherein the pressing portion presses a pressed portion that is provided on the concave portion on at least one of the first wedge and the second wedge to move the one of the first wedge and the second wedge in a direction in which the wedge is pulled out from the narrow-width portion of the eccentric annular space or in a direction in which the wedge is pushed into the narrow-width portion of the eccentric annular space, and
wherein the striker includes:
a first protrusion portion capable of pressing one of the first wedge and the second wedge in a direction in which the one of the first wedge and the second wedge is pulled out from the narrow-width portion of the eccentric annular space, and
a second protrusion portion capable of pressing the pressed portion of the other of the first wedge and the second wedge and pushing the other wedge into the narrow-width portion of the eccentric annular space.

16. A reclining device comprising:
an internal gear, which includes internal teeth on an internal circumferential surface and is provided on a member that is on one of a seat cushion side and a seat back side, wherein the internal gear is formed with one of a circular hole and a cylinder;
an external gear, which includes external teeth which are engaged with the internal teeth of the internal gear, are provided on an external circumferential surface, and whose number is smaller than the number of the internal teeth, is provided on a member that is on an other of the seat cushion side and the seat back side, wherein in a case where the circular hole is formed in the internal gear, the external gear is formed with a cylinder that is inserted into the circular hole, and in a case where the cylinder is formed in the internal gear, the external gear is formed with a circular hole that is inserted into the cylinder;
a first wedge and a second wedge, which are movably provided along a circumferential direction in an eccentric annular space between an internal surface of the circular hole and an external surface of the cylinder;
a biasing member, which biases the first wedge and the second wedge in a direction of a narrow-width portion of the eccentric annular space; and
a striker, which has a pressing portion capable of pressing the first wedge and the second wedge,
wherein a concave portion that is recessed in an axial direction is formed on the first wedge and the second wedge,
wherein the pressing portion of the striker is superimposed, in the axial direction, on a bottom surface of the concave portion,
wherein the pressing portion presses a pressed portion that is provided on the concave portion on at least one of the first wedge and the second wedge to move the one of the first wedge and the second wedge in a direction in which the wedge is pulled out from the narrow-width portion of the eccentric annular space or in a direction in which the wedge is pushed into the narrow-width portion of the eccentric annular space, and
wherein the striker includes:
a first protrusion portion, and
a second protrusion portion,
wherein an inclination surface is provided on at least one of the pressed portion of the other wedge and the second protrusion portion of the striker, and
wherein the inclination surface is inclined, in a state being pressed, such that the other wedge is into press-contact with one of the internal surface of the circular hole and the external surface of the cylinder.

* * * * *